United States Patent [19]

Tanaka et al.

[11] Patent Number: 4,945,199
[45] Date of Patent: Jul. 31, 1990

[54] ELECTRIC DISCHARGE MACHINING METHOD AND DEVICE

[75] Inventors: Toshiaki Tanaka; Morihisa Nishikawa; Yoshio Ozaki; Kooji Akamatsu; Masahiro Nakata; Atsushi Taneda, all of Aichi, Japan

[73] Assignee: Mitsubishi Denki Kabushiki Kaisha, Tokyo, Japan

[21] Appl. No.: 231,820
[22] PCT Filed: Nov. 10, 1987
[86] PCT No.: PCT/JP87/00868
§ 371 Date: Aug. 25, 1988
§ 102(e) Date: Aug. 25, 1988
[87] PCT Pub. No.: WO88/03453
PCT Pub. Date: May 19, 1988

[30] Foreign Application Priority Data

Nov. 14, 1986 [JP] Japan .................. 61-271061

[51] Int. Cl.⁵ .............................. B23H 1/02
[52] U.S. Cl. .............................. 219/69.13
[58] Field of Search ............. 219/69.13, 69.14, 69.18, 219/69.17

[56] References Cited

U.S. PATENT DOCUMENTS

| 3,604,885 | 9/1971 | Inoue | 219/69.18 |
| 3,655,937 | 4/1972 | Ullmann et al. | 219/69.18 |
| 3,987,269 | 10/1976 | Inoue et al. | 219/69.13 |
| 4,288,675 | 9/1981 | Inoue | 219/69.18 |

FOREIGN PATENT DOCUMENTS

| 2038748 | 7/1971 | Fed. Rep. of Germany . |
| 236461302 | 6/1974 | Fed. Rep. of Germany . |
| 2713427 | 9/1978 | Fed. Rep. of Germany . |
| 3042653 | 6/1981 | Fed. Rep. of Germany . |
| 60-85826 | 5/1985 | Japan . |
| 61-25725 | 2/1986 | Japan ................. 219/69.14 |
| 525061 | 8/1972 | Switzerland . |

Primary Examiner—A. D. Pellinen
Assistant Examiner—Geoffrey S. Evans
Attorney, Agent, or Firm—Sughrue, Mion, Zinn, MacPeak & Seas

[57] ABSTRACT

An electric discharge machining device, in which a pulse voltage is repeatedly applied between electrodes, which are an electrode and a workpiece to be machined, to cause electric discharge between the electrodes and thereby machine the workpiece. The electric discharge machining device includes a switching device (4) connected between a power source and the machining section, for controlling energy supplied by the power source; interelectrode impedance detecting apparatus (10) for detecting an interelectrode impedance affected by the variation in place of electric discharge which takes place between the electrodes; discharge detecting apparatus for detecting when electric discharge takes place between the electrodes; and a control device (18). The control device utilizes the output of the interelectrode impedance detecting apparatus to calculate a power source internal impedance to obtain a desired no-load voltage, and a power source internal impedance to obtain a desired current at the detection of electric discharge to thereby control the switching device. As a result, the discharge machining operation is stably carried out, the machined surface is uniform in surface roughness, and for a desired surface roughness the highest machining speed can be employed.

18 Claims, 11 Drawing Sheets $$R_{gap} = \rho \cdot \frac{\ell}{S}$$

ELECTRIC DISCHARGE MACHINING METHOD AND DEVICE

DESCRIPTION

1. TECHNICAL FIELD

This invention relates to an electric discharge machining method and an electric discharge machining device for use in an electric discharge machine using an electrically conductive solution as its machining solution.

2. TECHNICAL BACKGROUND

FIG. 9 is a circuit diagram showing a machining power source according to a conventional electric discharge machining method disclosed, for instance, by Japanese Patent Application (OPI) No. 85826/1985 (the term "OPI" as used herein means an "unexamined published application"). In FIG. 9, reference numeral 1 designates a machining electrode; 2, a workpiece; 3, a second DC power source; 4 and 26, power transistors; 5 and 25, current limiting resistors connected to the emitters of the power transistors 4 and 26, respectively; 9, discharge detecting means for detecting when electric discharge takes place between the electrodes, namely, the electrode 1 and the workpiece 2; 12, switching means; 13, a second drive circuit for driving the power transistor 4; 6 and 15, diodes for preventing reverse current; 18, a first drive circuit for driving the power transistor 26; and 19, a first DC power source. The switching means 12 control the first and second drive circuits 13 and 18.

The electrical characteristics of the circuit in the case where an electrically conductive solution is used will be described.

If, in this case, the machining electrode 1 and the workpiece 2 are flat plates arranged in parallel to each other, then the interelectrode impedance Rgap can be represented by the following equation (1) as indicated in FIG. 10:

$$Rgap = \rho \frac{l}{S} \tag{1}$$

where $\rho$ is the specific resistance ($\Omega$ cm) of the machining solution, l is the distance (cm) between the electrodes, and S is the confronting area (cm$^2$) between the electrodes.

When the power transistor 4 is turned on by the second drive circuit 13, a voltage Vgopen as shown in the part (a) of FIG. 6 is developed between the electrodes, namely, the machining electrode 1 and the workpiece 2 before electric discharge takes place therebetween. In this case, according to Ohm's law, the voltage Vgopen is:

$$Vgopen = \frac{Rgap}{Rgap + R_M} \cdot E \tag{2}$$

where $R_M$ is the current limiting resistance, and E is the DC supply voltage.

Hereinafter, the voltage Vgopen will be referred to as "a no-load voltage", and the interelectrode voltage provided after electric discharge will be referred to as "an arc voltage Vgarc", when applicable.

The current flowing between the electrodes is as follows: That is, if the total current supplied by the power source is represented by I, with respect to the interelectrode impedance Rgap an electrolytic current flowing according to Ohm's law at the application of a no-load voltage is represented by $I_{Eopen}$, and that during electric discharge is represented by $I_{Earc}$, and a discharge current in the electric discharge is represented by Id, then Before electric discharge $$I = I_{Eopen} \tag{3}$$

During electric discharge $$I = Id + I_{Earc} \tag{4}$$

where $$I_{Eopen} = \frac{Vgopen}{Rgap} \tag{5}$$

$$I_{Earc} = \frac{Vgarc}{Rgap} \tag{6}$$

As is clear from equation (1), the interelectrode impedance Rgap is decreased as the resistivity $\rho$ of the machining solution or the interelectrode distance l is decreased, and as the confronting area S between the electrodes is increased. Furthermore, as is apparent from equation (2), the no-load voltage Vgopen decreases as the interelectrode impedance Rgap decreases. When the no-load voltage becomes lower than the arc voltage Vgarc, then no electric discharge will take place between the electrodes; that is, the workpiece cannot be machined. Therefore, in the discharge-machining of a large area, the resistivity $\rho$ of the machining solution should be maintained high to some extent. For this purpose, the resistivity $\rho$ is controlled by using ion exchange resin for instance.

On the other hand, when it is required to decrease the discharge current Id, the resistance $R_M$ of the current limiting resistor 5 should be set to a large value; however, in this case, the no-load voltage Vgopen is decreased, thus making it difficult for electric discharge to take place; that is, the machining efficiency is lowered.

For the purpose of eliminating the abovedescribed difficulty, the following electric discharge machining method is employed for an electric discharge machine using an electrically conductive machining solution.

As was described above, FIG. 9 shows the discharge machining power source circuit. In FIG. 9 two current circuits are connected in parallel to the electrode 1 and the workpiece 2. The machining current (or discharge current) is supplied by the circuit comprising the power transistor 4, the second DC power source 3, the current limiting resistor 5, and the diode 6. The power transistor 4 is driven by the second drive circuit 13. Before electric discharge takes place, the circuit comprising the power transistor 26 driven by the first drive circuit 18, the current limiting resistor 25, the diode 15, and the first DC power source 19, applies a larger current between the electrode 1 and the workpiece 2. That is, the current is made larger than that which flows during the discharge period, whereby the interelectrode voltage under no load is increased to cause electric discharge between the electrodes with ease. When electric discharge takes place between the electrodes, the discharge detecting means 9 detects the occurrence of electric discharge, and the switching means 12 applies a signal to the first drive circuit 18, so that the power transistor 26 is turned off, and the discharge current is therefore supplied from the second DC power source 3 only.

In this case, the resistance $R_M$ of the resistor 5 has been set to a value with which a discharge current corresponding to a desired surface roughness and machining speed can be obtained, and the resistance $R_S$ of the resistor 25 has been set a value with which, with the resistance $R_M$ taken into account, a current necessary for the provision of a no-load voltage high enough to start electric discharge can be obtained.

The no-load voltage Vgopen thus obtained is:

$$V_{gopen} = \frac{\frac{E_1}{R_S} + \frac{E_2}{R_M}}{\frac{1}{R_M} + \frac{1}{R_S} + \frac{1}{R_{gap}}} \quad (7)$$

where $E_1$ is the DC supply voltage on the side of the first drive circuit, and $E_2$ is the DC supply voltage on the side of the second drive circuit.

As is apparent from the above description, in the conventional discharge machining method, the power source internal impedance is switched. However, in the case where the interelectrode impedance Rgap is obtained from equation (1) for calculation of the power source internal impedance, there are the following problems:

(1) The confronting surfaces of the electrode 1 and the workpiece 2 are not always flat. Therefore, it is not always possible to insert the distance between the electrodes in "l" in equation (1) as it is.

(2) As shown in FIG. 11, depending on a machining pattern, the confronting area between the electrodes is varied as the machining operation makes progress. The variation of the interelectrode impedance Rgap due to that variation of the confronting area is too large to be neglected.

(3) The resistivity of the electrically conductive machining solution changes with progress of the machining operation, and, as shown in FIG. 12, has different values in the machining solution tank, in the machining bath, and in the discharge gap. Thus, it is difficult to measure the resistivity of the machining solution in the discharge gap.

Thus, it is difficult to calculate the interelectrode impedance Rgap by using the interelectrode distance l, the confronting area S between the electrodes, and the resistivity $\rho$ of the machining solution, while the interelectrode impedance changes with progress of the machining operation. If, with the interelectrode impedance Rgap changing with progress of the machining operation, the power source internal impedance is not corrected, then the following difficulty will be involved:

As the electrolytic current $I_{Earc}$ flowing during the electric discharge changes, the discharge current Id is changed as is apparent from equation (4). As a result, for the aimed surface roughness, it is impossible to maintain the highest machining speed or to maintain the machined surface uniform in roughness.

Accordingly, an object of this invention is to eliminate the above-described difficulties. More specifically, an object of the invention is to provide an electric discharge machining method in which a discharge machining operation is stably carried out, and a power source internal impedance is automatically changed and set, whereby the machined surface is uniform in roughness while the interelectrode impedance Rgap is being affected by the interelectrode distance l, confronting area S, and resistivity $\rho$ which change with progress of the discharge machining operation, and in which for an aimed surface roughness, the highest machining speed can be maintained at all times.

In the electric discharge machining method according to the invention, an interelectrode impedance is detected, and according to the interelectrode impedance thus detected, a power source internal impedance with which a desired no-load voltage is obtained and a power source internal impedance with which a desired discharge current is obtained are calculated, and those internal impedances are set up for a discharge-machining power source circuit.

In the electric discharge machining method of the invention, the interelectrode impedance detected is so utilized that, during the no-load period which elapses from the application of voltage between the electrodes until electric discharge takes place therebetween, a power source internal impedance with which a no-load voltage equal to or higher than the discharge starting voltage is supplied is calculated, and after the discharge starts, a power source internal impedance with which a desired current is supplied is controlled to a predetermined value.

BEST MODE FOR CARRYING OUT THE INVENTION

Figure 1:
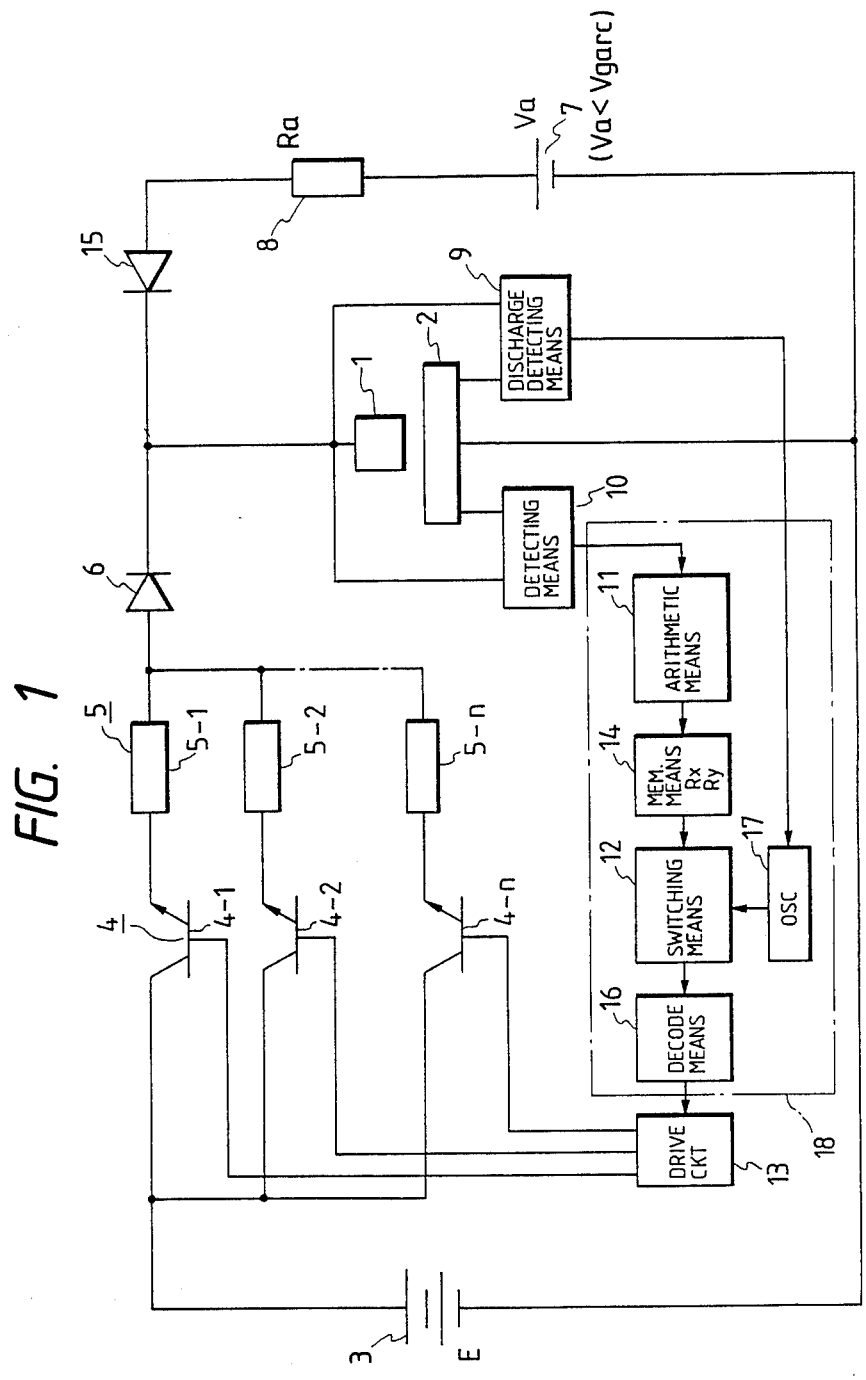
FIG. 1 is a circuit diagram showing a machining power source employed in one example of an electric discharge machining method according to this invention.

On embodiment of this invention will be described with reference to the accompanying drawings.

In FIGS. 1 through 5, reference numeral 1 designates a machining electrode; 2, a workpiece; 3, a machining DC power source; 4, a group of power transistors 4-1, 4-2, . . . , and 4-n (hereinafter referred to as "a power transistor group 4", when applicable); 5, a group of current limiting resistors 5-1, 5-2, . . . and 5-n which are connected to the emitters of the power transistors 4-1 through 4-n, respectively (hereinafter referred to as "a current limiting resistor group", when applicable); 6 and 15, diodes for preventing reverse current; 7, a detecting DC power source; 8, a resistor for limiting the output current of the detecting DC power source 7; 9, discharge detecting means for detecting when electric discharge takes place between the electrodes; 10, detecting means for detecting an interelectrode impedance Rgap; 11, arithmetic means for calculating a power source internal impedance suitable for the interelectrode impedance Rgap detected by the detecting means 10; and 12, switching means for determining the on-off pattern of the power transistor group 4, i.e., an switching output, from the result of calculation provided by the arithmetic means 11, and temporarily storing a plurality of such patterns.

Further in FIGS. 1 through 5, reference numeral 13 designates a drive circuit which can turn on desired ones, in combination, of the power transistors 4-1 through 4-n; 14, memory means for storing a power source internal impedance calculated by the arithmetic means 11; 16, decode means for determining patterns of combination of the resistors in the current limiting resistor group 5 and the power transistors connected thereto; 17, an oscillator for transmitting the output signal of the discharge detecting means 9 to the switching means 12; 18, a power source control circuit comprising the above-described elements 11, 12, 14, 16 and 17; 19, a detecting resistor switching circuit for switching the current limiting resistors 8; and 24, a voltage divider for dividing the voltage appearing across the interelectrodes.

The operations of the above-described circuit elements will be described.

The detecting means 10 directly measures the interelectrode impedance Rgap according to the following methods: These methods can eliminate the above-described difficulties, because they can directly measure the interelectrode impedance Rgap independently of the interelectrode distance l, the interelectrode confronting area S, and the specific resistance of the machining solution in equation (1) above.

The first method is as follows: While the machining DC power source 3 is at rest, a detecting voltage which is the same in polarity as that of the machining DC power source 3 is applied between the electrodes, and the voltage developed between the electrodes is utilized to calculate the inter-electrode impedance Rgap.

Figure 2:
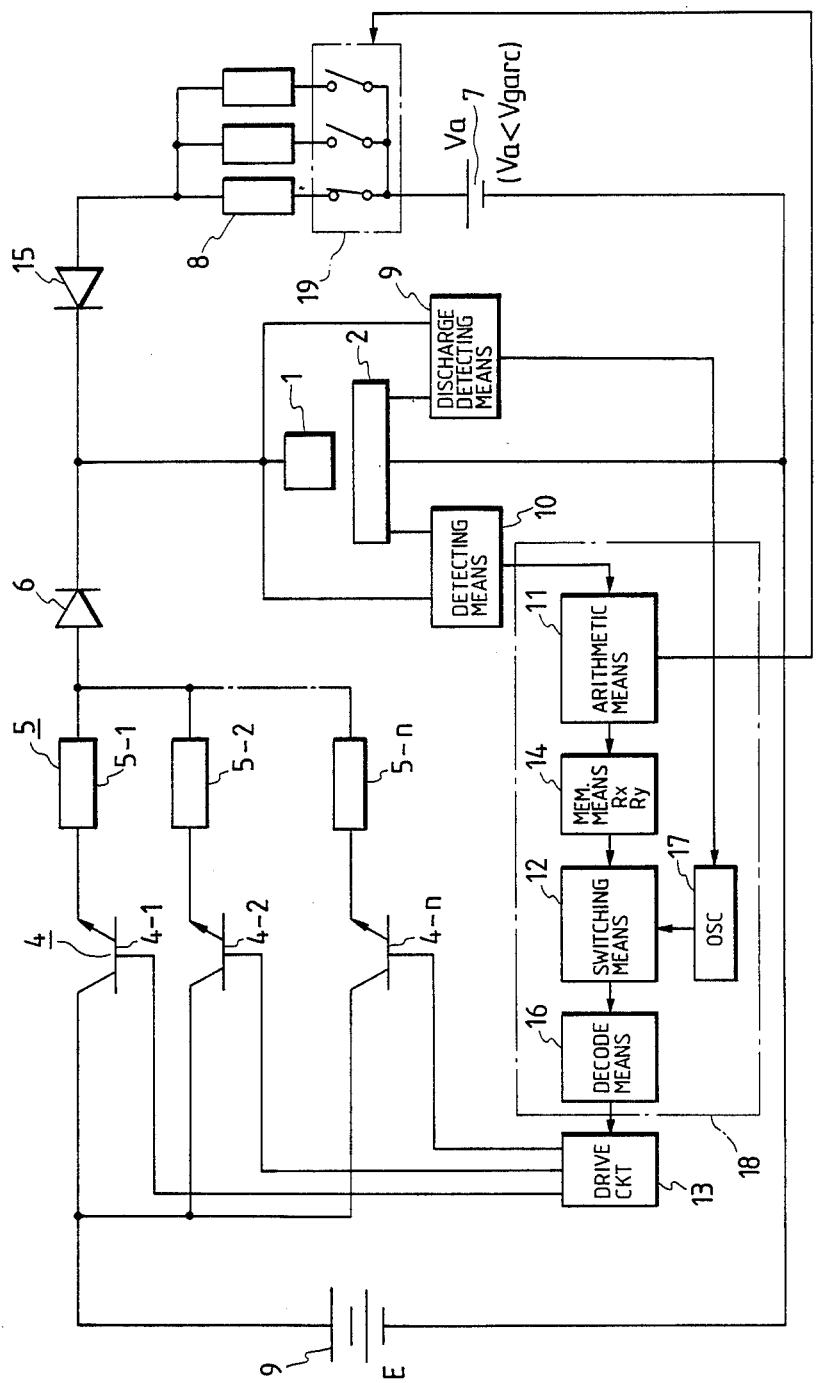
FIGS. 2 through 5 are circuit diagrams showing machining power sources in other examples of the electric discharge machining method of the invention, respectively.

That is, as shown in FIGS. 1 or 2, the detecting DC power source 7 is connected through the current limiting resistor or resistors 8 to the electrodes. If, during detection, electric discharge takes place between the electrodes, it is impossible to achieve the detection. Therefore, the interelectrode voltage Vga should be so determined that it may not exceed the arc voltage. Therefore, if the voltage Va of the detecting DC power source 7 is set lower than the arc voltage Vgarc as shown in FIG. 1, then control can be achieved with ease. Even in the case of Va > Vgarc, the supply voltage Va can be set lower than the arc voltage Vgarc, if, as shown in FIG. 2, the voltage Vgap detected by the detecting means 10 is processed by the arithmetic means 11, and the current limiting resistor or resistors are selected by the detecting resistor switching circuit 19. Furthermore, when the current limiting resistors are suitable selected to provide the best resistance, then the accuracy of detection of the voltage Vgap detected by the detecting means 10 can be increased.

The supply voltage Va, the resistance Ra, the measured interelectrode voltage Vga, and the measured interelectrode impedance Rgap has the following relation:

$$Vga = \frac{Rgap}{Ra + Rgap} \cdot Va$$

Therefore, the interelectrode impedance Rgap is:

$$Rgap = \frac{Vga}{Va - Vga} \cdot Ra \qquad (8)$$

Figure 3:
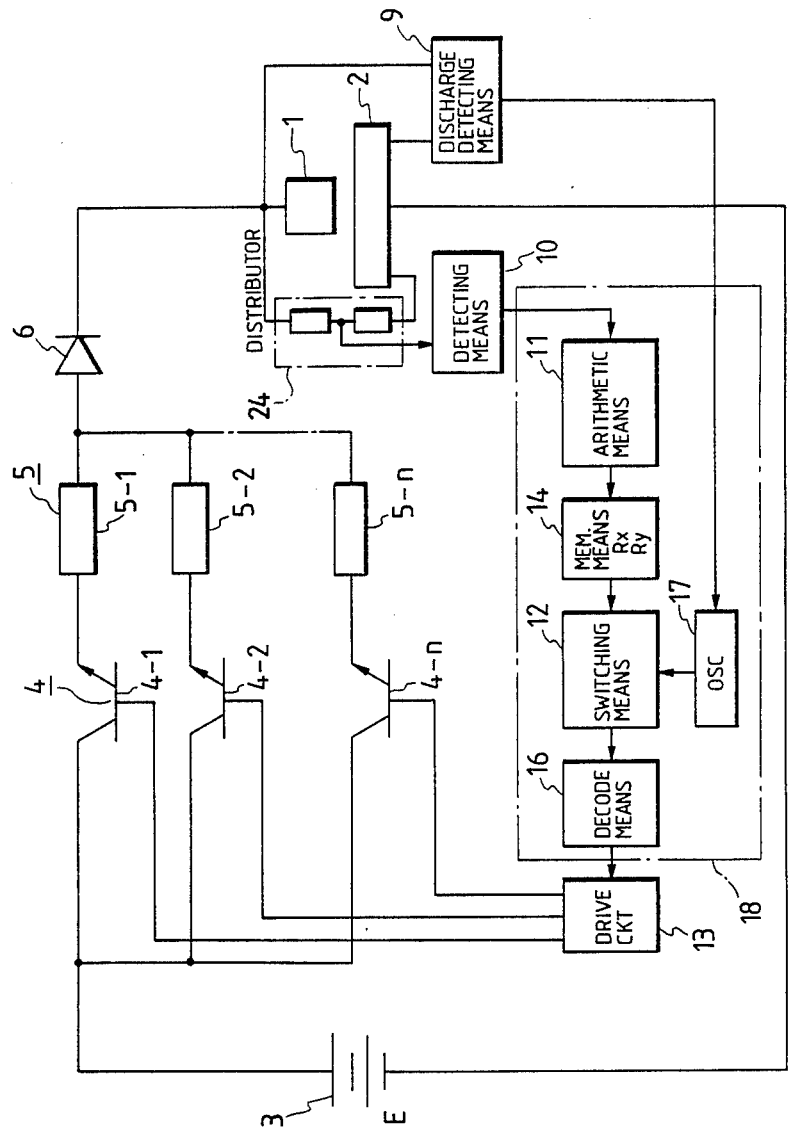

The interelectrode impedance Rgap can be obtained according to the following method, too:

That is, in FIG. 3, voltage is applied between the electrodes by the machining power source 3, and the interelectrode voltage Vgopen provided during the no-load period in which no discharge takes place is utilized to calculate the interelectrode impedance Rgap. This will be described in more detail. The supply voltage E, the interelectrode voltage Vgopen, and the interelectrode impedance Rgap have the following relation:

$$Vgopen = \frac{Rgap}{Rgap + Rx} \cdot E$$

where Rx is the power source internal resistance at the application of no-load voltage.

Therefore, the interelectrode impedance Rgap is:

$$Rgap = \frac{Vgopen}{E - Vgopen} \cdot Rx \qquad (9)$$

The interelectrode voltage Vgopen may be inputted through an A/D converter, as a digital value, into the detecting means 10.

The method is advantageous in that it is unnecessary to use the interelectrode impedance Rgap detecting DC power source Va (7), and the current limiting resistor Ra (8).

On the other hand, the method is disadvantageous in that, in the case where electric discharge occurs immediately after the application of voltage between the electrode by the machining power source, the interelectrode voltage Vgopen under no load cannot be detected, and therefore the interelectrode impedance Rgap cannot be calculated.

Figure 4:
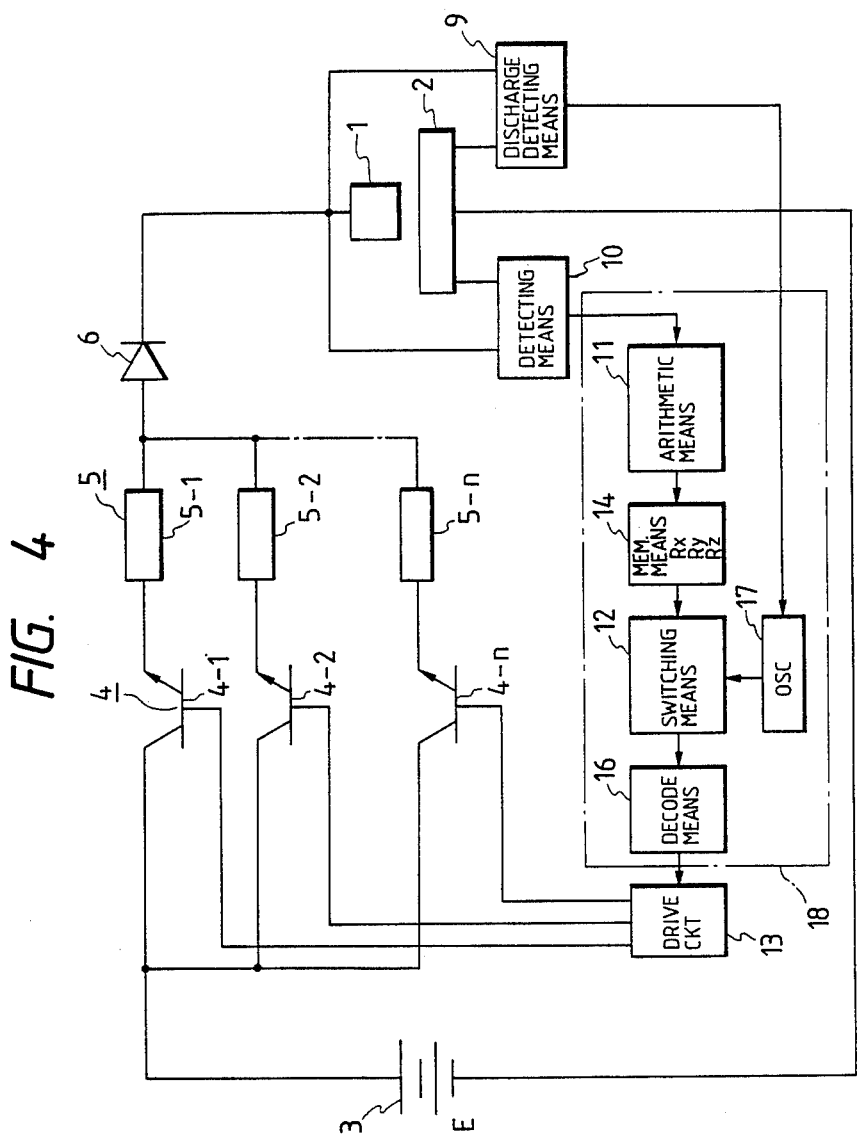

A third method of obtaining the interelectrode impedance Rgap is as follows: As shown in FIG. 4, even in the pause period, some of the power transistors 4-1 through 4-n are turned on, and the resistance of the current limiting resistors (5) is set to a sufficiently large value so that the interelectrode voltage is lower than the arc voltage, and the voltage Vgz provided between the electrodes is utilized for calculation of the interelectrode impedance. If the power source internal impedance provided during the pause period is represented by Rz, then the following relation is established by the supply voltage E, the interelectrode voltage Vgz, and the interelectrode impedance Rgap:

$$Vgz = \frac{Rgap}{Rz + Rgap} \cdot E$$

Therefore, the interelectrode impedance Rgap is:

$$Rgap = \frac{Vgz}{E - Vgz} \cdot Rz \qquad (10)$$

The above-described method is advantageous in that the interelectrode impedance Rgap, the detecting DC power source Va (7), and the current limiting resistor Ra (8) are unnecessary. Furthermore, in the method, during the pause period the interelectrode voltage Vgz is detected for calculation of the interelectrode impedance Rgap, and therefore similarly as in the above-described second method the interelectrode impedance Rgap can be calculated even in the case where discharge takes place immediately after the application of voltage, and there is no no-load period.

Figure 5:
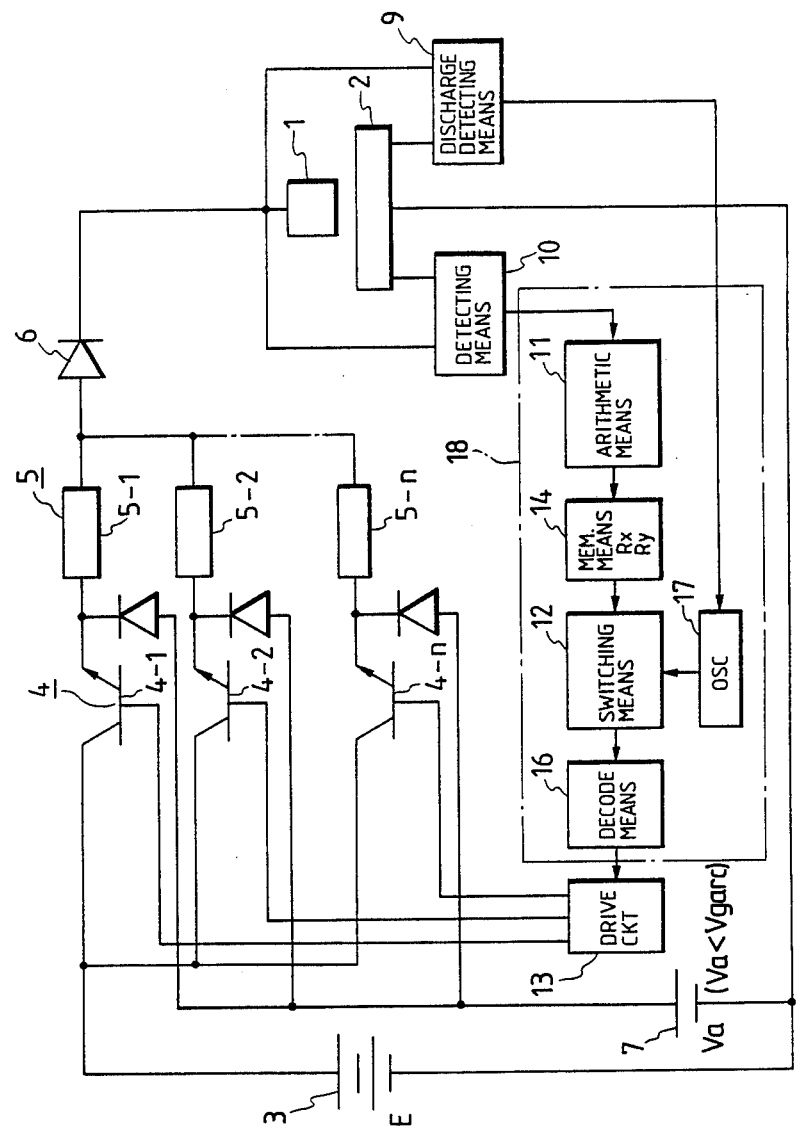

A fourth method of obtaining the interelectrode impedance Rgap is as follows: In the fourth method as shown in FIG. 5, during the pause period of the machining power source 3, the detecting DC power source 7 whose voltage is lower than the arc voltage Vgarc is used to apply the detecting voltage between the electrodes which is the same in polarity as that of the machining power source 3, and the voltage developed between the electrodes is utilized for calculation of the interelectrode impedance Rgap. The specific feature of the method resides in that the current limiting resistor group 5 of the machining power source 3 is utilized as the current limiting resistance for the detecting DC power source 7. Therefore, when compared with the above-described "first method of obtaining the interelectrode impedance Rgap", the method is advantageous in that it is unnecessary to additionally provide current limiting resistors 8 for the detecting DC power source 7.

Figure 6A:
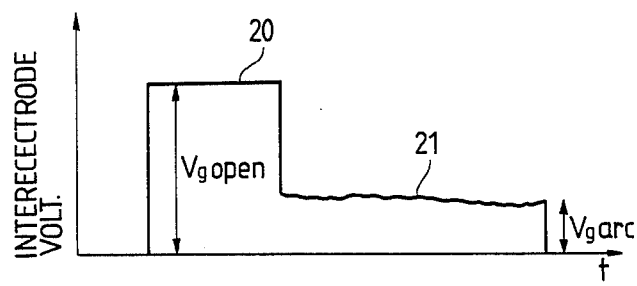
FIG. 6 is a waveform diagram showing interelectrode voltages and interelectrode currents.
Figure 6B:
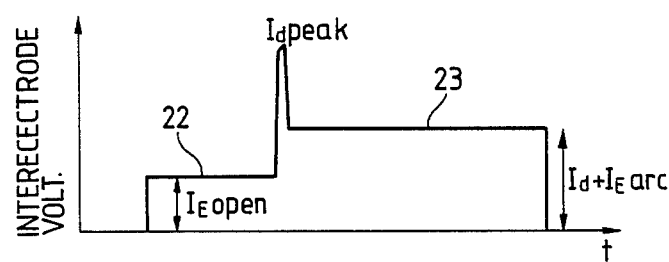
Figure 7:
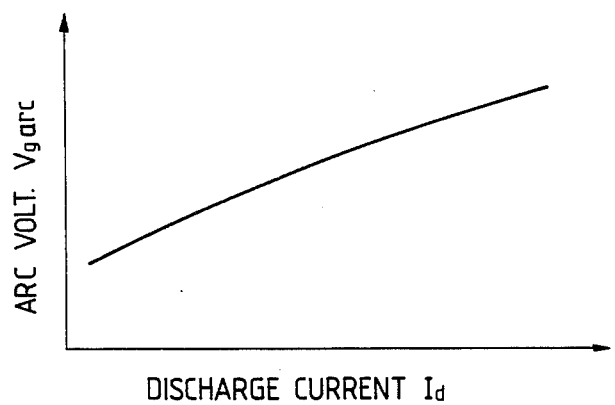
FIG. 7 is a graphical representation indicating arc voltage with discharge current.

The arithmetic means 11 utilizes the interelectrode impedance measured by the detecting means 10 to calculate power source internal impedances separately according to the following conditions:

Firstly, under the no-load condition which is provided after application of the voltage until electric discharge occurs between the electrodes, the power source internal impedance Rx providing a no-load voltage Vgopen high enough to permit electric discharge to take place is calculated. Upon detection of the occurrence of electric discharge between the electrodes, the power source internal impedance Rx is switched over to a power source internal impedance Ry to obtain a desired discharge current Id during the discharge; however, since the switching elements 4 such as power transistors have switching delay time, during that period the following instantaneous current $I_{DPeak}$ flows between the electrodes as shown in the part (b) of FIG. 6. Thus, the method suffers from a difficulty that a current larger than the desired discharge current Id flows as the instantaneous current $I_{Dpeak}$, thus roughening the machining surface.

$$I_{Dpeak} = \frac{E - Vgarc}{Rx} \quad I_{Earc} =$$

$$\frac{E - Vgarc}{Rx} - \frac{(E - Vgopen) \times Vgarc}{Rx \, Vgopen} =$$

$$\frac{E}{Rx}\left(1 - \frac{Vgarc}{Vgopen}\right)$$

In order to obtain a high no-load voltage Vgopen, the power source internal impedance Rx should be small; however, it is set to a suitable value with which the instantaneous current $I_{Dpeak}$ will not roughen the machining surface.

In this case, the relation between the no-load voltage Vgopen and the interelectrode impedance Rgap and the power source internal impedance Rx is:

$$Vgopen = \frac{Rgap}{Rgap + Rx} \cdot E$$

Therefore, $$Rx = Rgap\left(\frac{E}{Vgopen} - 1\right) \qquad (11)$$

where E is the voltage of the DC power source 3.

That is, the aimed no-load voltage Vgopen and the measured interelectrode Rgap are utilized to calculate the power source internal impedance Rx according the abovedescribed equation 11.

Secondly, during electric discharge, an electrolytic current, which does not contribute to the machining of the workpiece, changes with the interelectrode impedance Rgap, and therefore in order to control the discharge current Id which is necessary for the machining of the workpiece, the total current I which is the sum of the discharge current Id and the electrolytic current IEarc is controlled according to the interelectrode impedance Rgap.

During the discharge, the electrolytic current $I_{Earc}$ and the discharge current Id can be represented by the following equations:

$$I_{Earc} = \frac{Vgarc}{Rgap}$$

$$Id + I_{Earc} = \frac{E - Vgarc}{Ry}$$

In the above-described equation, Ry is the power source internal impedance which is a composite resistance determined by selectively combining the current limiting resistors. It has been confirmed through experiment that the arc voltage Vgarc depends on the discharge current Id. By using the measured interelectrode impedance Rgap, the desired discharge current value Id, and the arc voltage Vgarc, the power source internal impedance Ry is:

$$\frac{E - Vgarc}{Id + \frac{Vgarc}{Rgap}} \qquad (12)$$

The power source internal impedances Rx and Ry calculated by the arithmetic means 11 are applied to the memory means 14. In the case of the (above-described third) method of applying a voltage between the electrodes during the pause period to obtain the interelectrode impedance Rgap, a power source internal impedance Rz with which, during the pause period, the interelectrode voltage is set to lower than the arc voltage is also applied to the memory means 14. The switching means 12 operates to select Rx during the no-load period, Ry during the discharge, and Rz during the pause period. For the purpose of realizing the internal impedances Rx, Ry and Rx, the decode means 16 determines those to be used in combination of the current limiting resistors (5), and selects the power transistors connected to the resistors thus determined, and provides power transistor combination patterns for instance as follows:

$$\frac{1}{Rx} = a_1 \frac{1}{R_1} + a_2 \frac{1}{R_2} + \ldots + a_n \frac{1}{R_n} \quad (13)$$

where $a_1, a_2, \ldots$ and $a_n$ are 0 or 1.

In the equation, Rx may be replaced by Ry or Rz. And in the equation, $R_1, R_2, \ldots$ and $R_n$ are the resistances of the current limiting resistors 5-1, 5-2, ... and 5-n, respectively. The sequence $\{a_n\}$ is so determined that the following is established:

$$a_k = \begin{cases} 0: \text{power transistor on} \\ 1: \text{power transistor off} \end{cases}$$
$$(k = 1, 2, \ldots n)$$

The aimed no-load voltage Vgopen should be equal to at least the arc voltage Vgarc; however, it may be any value higher than the arc voltage.

When a target value has been determined for the no-load voltage Vgopen, the following two control methods may be considered: in the first control method the no-load voltage is made to be coincident with the target value, and in the second control method, in the case where values higher than the target value can be readily obtained, the no-load voltage is not particularly reduced to the target value. That is, in the case where the electrode area S is small, and the interelectrode impedance Rgap is sufficiently high, the second control method may be taken.

However, discharge detection by the discharge detecting means 9 is, in general, achieved by comparing the interelectrode voltage with a reference discharge voltage, and therefore the no-load voltage depends on the time delay of discharge detection. Accordingly, the no-load voltage should be maintained as constant as possible, and it is preferable that control is so made by the arithmetic means 11 that the no-load voltage is constant.

By the above-described method, the interelectrode impedance Rgap can be calculated with the detecting means 10, and the data calculated can be outputted every voltage pulse.

The arithmetic means 11 utilizes the interelectrode impedance Rgap, which is outputted by the detecting means 10 every voltage pulse, to calculate the power source internal impedance.

In obtaining the power source internal impedance from the interelectrode impedance outputted by the detecting means 10, the interelectrode impedance Rgap data calculated may be processed by the following methods:

In a first one of the methods, the interelectrode impedance Rgap outputted every pulse is utilized for calculation of the internal impedance at the next pulse. More specifically, in the method, the interelectrode impedance at the preceding pulse is utilized for determination of the internal impedance when the present pulse is applied. Thus, the method can respond to the change in condition between the electrodes.

On the other hand, during an electric discharge machining operation, the electrodes may be short-circuited or almost short-circuited temporarily by a turbulance such as accumulation of chips.

Under this condition, the interelectrode voltage is zero or almost zero. That is, zero or a value close to zero can be inserted in Rga, Rgopen and Rgz in equations (8), (9) and (10). Therefore, as Rgap approaches zero, Rx and Ry calculated by equations (11) and (12) also approaches zero. This means that the machining DC power source 3 supplies a large current between the electrodes through a small resistance. Therefore, in this case, electric discharge takes place with large energy, as a result of which the machining surface is roughened more than intended.

Figure 8:
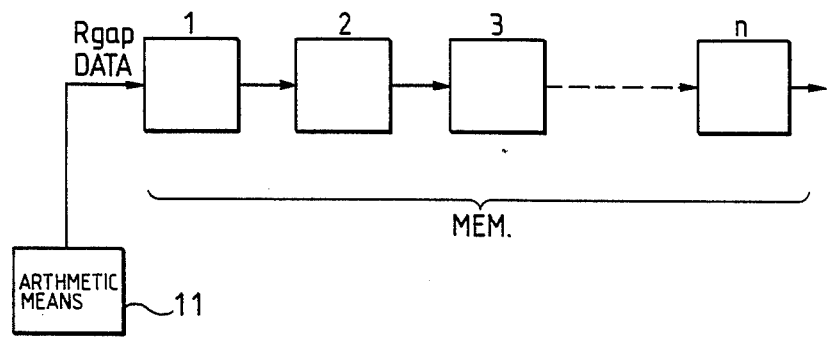
FIG. 8 is an explanatory diagram showing a memory for storing the latest interelectrode impedance.
Figure 10:
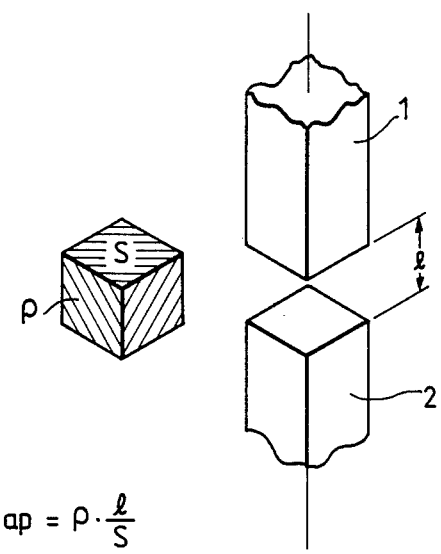
FIG. 10 is an explanatory diagram showing the arrangement of electrodes with an electrically conductive machining solution.
Figure 9:
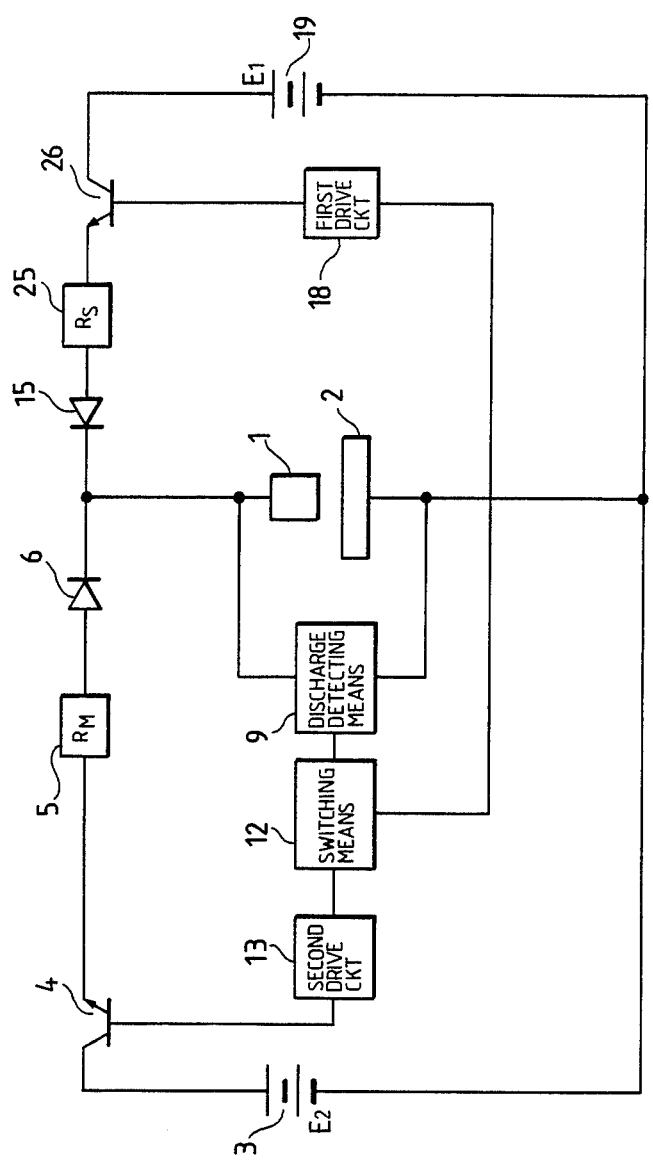
FIG. 9 is a circuit diagram showing a machining power source employed in a conventional electric discharge machining method.
Figure 11A:
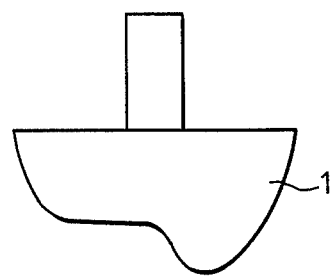
FIG. 11 is an explanatory diagram showing increase of the confronting area of an electrode intricate in configuration with progress of the discharge machining operation.
Figure 11B:
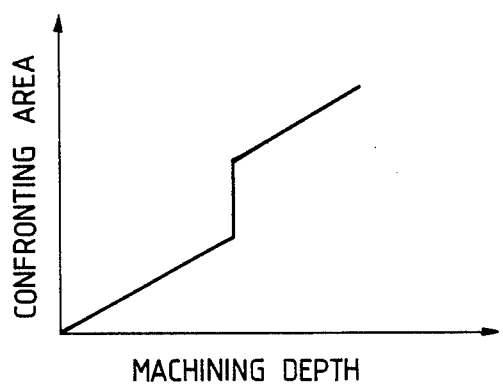
Figure 12:
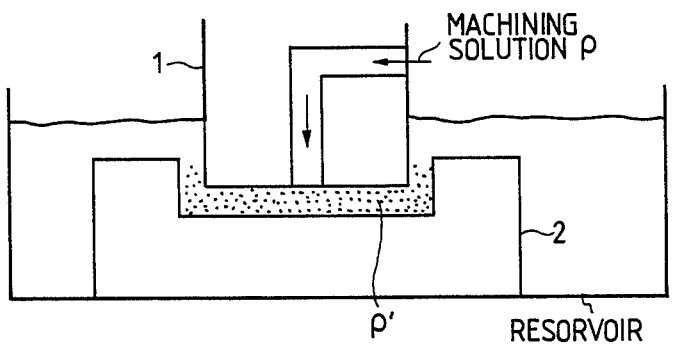
FIG. 12 is an explanatory diagram showing the variation in resistivity of a machining solution.

In order to eliminate the above-described difficulty, a second method is provided. In the second method, the average value Rgap-m of n latest ones of interelectrode impedance Rgap data is obtained, and it is utilized for calculation of the internal impedance. Let us consider a memory having addresses 1 through n as shown in FIG. 8. Rgap data are stored in the memory in such a manner that newly inputted data is stored in the address 1 always, the old data in the address 1 is shifted to the next address. Thus, the memory stores n latest Rgap data at all times. By using the contents of the memory, the arithmetic means 11 performs the following calculation:

$$Rgap\text{-}m = \frac{Rgap(1) + Rgap(2) + \ldots + Rgap(n)}{n}$$

The average value Rgap-m thus obtained is utilized for calculation of the power source internal impedance.

The following third method may be realized by using the memory described above with respect to the second method: That is, in the third method, of the n latest interelectrode impedances Rgap stored in the memory, the largest Rgap is employed as a typical value. Setting the value n to a suitable value can eliminate the difficulty that the value Rgap of zero or nearly zero which occurs when the electrodes are short-circuited or almost short-circuited.

Next, the drive circuit 13 for the power transistor group 4 decodes a power transistor select combination pattern supplied from the switching means 12, to apply a signal to the signal lines connected to the bases of the concerned power transistors to turn on the latter on.

As was described above, in response to the variation of interelectrode impedance Rgap, the power source internal impedance is changed according to the following conditions of each voltage pulse:

(1) When the voltage is applied between the electrodes after the pause period, the power source internal impedance 11 is set to Rx calculated from equation (11), (2) When the discharge detecting means 9 detects when electric discharge takes places between the electrodes, the detection signal is applied to the switching means 12, so that the internal impedance Rx is changed over to Ry calculated from equation (12), and (3) When the desired voltage pulse period has passed, all the power transistors are turned off, so that the pause period is provided.

The machining operation is advanced by repeated carrying out the above-described operations.

As is apparent from the above description, the electric discharge machining method of the invention is so designed that the interelectrode impedance is detected from its variation attributing to the change in phase of the electric discharge between the electrodes, and the data thereof thus detected are utilized for calculation of the power source internal impedance. Therefore, with the method of the invention, the best no-load voltage and the desired machining current can be readily obtained. Accordingly, the resultant discharge-machined surface has a uniform surface roughness which is defined univocally by setting machining conditions, the machining operation being stable, and furthermore the large area machining operation and the finishing operation, which cannot be achieved by the conventional electric-discharge machining method, can be carried out. Thus, the electric discharge machining method of the invention will reduce the manufacturing cost. The effects in practical used of the method should be highly appreciated.

INDUSTRIAL APPLICABILITY

While the preferred embodiment of the invention has been described with reference to the general electric discharge machine, the technical concept of the invention is similarly applicable to wire cut type electric discharge machines.

We claim:

1. An electric discharge machining method in which an electrically conductive solution is used as a machining solution, a pulse voltage is repeatedly applied between electrodes which are an electrode and a workpiece to be machined, to cause electric discharge to take place between said electrodes, thereby to machine said workpiece; in which an interelectrode impedance Rgap defined by the distance between said electrodes, the confronting area thereof, and the specific resistivity of said electrically conductive solution is detected, during a no-load period which is provided after application of said voltage between said electrodes until electric discharge takes place between said electrodes, a power source internal impedance Rx with which a no-load voltage equal to or higher than a discharge starting voltage is supplied is set, after detection of the occurrence of electric discharge between said electrodes, a power source internal impedance Ry with which a desired machining current is supplied is set, and said machining current is allowed to flow for a predetermined period of time, and with a predetermined pause period, said series of operations are repeatedly carried out under control.

2. An electric discharge machining method as claimed in claim 1, in which said power source internal impedance Rx and Ry are calculated by using said detected interelectrode impedance Rgap.

3. An electric discharge machining method as claimed in claim 2, in which during a discharge voltage pause period a detecting DC power source whose output voltage is equal to or lower than an arc voltage is operated to apply a voltage, which is the same in polarity as that of a machining DC power source, between said electrodes through a current limiting resistor, and the resultant value of voltage or current provided between said electrodes are utilized for calculation of said interelectrode impedance Rgap.

4. An electric discharge machining method as claimed in claim 3, in which said interelectrode impedance Rgap is calculated from the following equation:

$$Rgap = \frac{Vga}{Va - Vga} \cdot Ra$$

where Va is the detecting power source voltage, Vga is the interelectrode voltage, and Ra is the resistance of a resistor (8).

5. An electric discharge machining method as claimed in claim 2, in which during a no-load period which elapses from application of a voltage between said electrodes by a machining DC power source until electric discharge takes place between said electrodes, the resultant value of voltage or current provided between said electrodes is utilized for calculation of said interelectrode impedance.

6. An electric discharge machining method as claimed in claim 5, in which said interelectrode impedance Rgap is calculated from the following equation:

$$Rgap = \frac{Vgopen}{E - Vgopen} \cdot Rx$$

where Vgopen is the interelectrode voltage during the no-load period, E is the supply voltage, and Rx is the power source internal impedance at the application of the no-load voltage.

7. An electric discharge machining method as claimed in claim 2, in which during a discharge voltage pause period, a machining DC power source applies a voltage between said electrodes through a current limiting resistor, and the resultant value of voltage or current provided between said electrodes is utilized for calculation of said interelectrode impedance Rgap.

8. An electric discharge machining method as claimed in claim 7, in which said interelectrode impedance is calculated from the following equation:

$$Rgap = \frac{Vgz}{E - Vgz} \cdot Rz$$

where E is the supply voltage, Vgz is the interelectrode voltage, and Rz is the power source internal impedance during the pause period.

9. An electric discharge machining method as claimed in claim 1, in which a no-load voltage set during a no-load period which elapses from application of a voltage between said electrodes until electric discharge takes place between said electrodes has a predetermined value equal to or higher than a discharge starting voltage.

10. An electric discharge machining method as claimed in claim 2, in which said power source internal impedances Rx and Ry are calculated from the following equations, respectively:

$$Rx = Rgap \left( \frac{E}{Vgopen} - 1 \right)$$

$$Ry = \frac{E - Vgarc}{Id + \frac{Vgarc}{Rgap}}$$

wherein Rgap is the interelectrode impedance, Vgopen is the no-load voltage, Vgarc is the arc voltage, E is the supply voltage, and Id is the discharge current.

11. An electric discharge machining method as claimed in claim 2, in which an interelectrode impedance Rgap outputted every pulse is utilized for calculation of said power source internal impedances Rx and Ry at the next pulse.

12. An electric discharge machining method as claimed in claim 2, in which the average value Rgap-m of n most recent interelectrode impedance Rgap data (where $n \geq 2$) is utilized for calculation of said power source internal impedance Rx and Ry.

13. An electric discharge machining method as claimed in claim 2, in which the largest of interelectrode impedance Rgap data is employed as a typical value for calculation of said power source internal impedances Rx and Ry.

14. An electric discharge machining device in which a pulse voltage is repeatedly applied to an interelectrode gap which is formed by an electrode and a workpiece to be machined, to cause electric discharge between said electrode and workpiece to machine said workpiece, which comprises:

switching means for controlling machining energy, which is connected between a power source and a machining section;

interelectrode impedance detecting means for detecting an interelectrode impedance affected by the variation in phase of electric discharge which takes place between said electrodes;

discharge detecting means for detecting when electric discharge takes place between said electrodes; and control means which, according to an output of said interelectrode impedance detecting means, calculates a power source internal impedance to obtain a desired no-load voltage, and a power source internal impedance to obtain a desired current at the detection of electric discharge thereby to control said switching means.

15. An electric discharge machining device as claimed in claim 14, in which said switching means comprises a plurality of power transistors parallel-connected.

16. An electric discharge machining device as claimed in claim 15, which further comprises a detecting DC power source connected between said electrodes in such a manner that said detecting DC power source is the same in polarity as said machining power source.

17. An electric discharge machining device as claimed in claim 16, in which a variable limiting resistor is connected in series to said detecting DC power source.

18. An electric discharge machining device as claimed in claim 14 which said control means comprises:

arithmetic means for calculating a power source internal impedance according to an interelectrode impedance detected; and means for controlling an output according to the result of calculation of said arithmetic means which is applied to said switching means.

* * * * *